United States Patent
Neubecker

(10) Patent No.: US 6,774,780 B1
(45) Date of Patent: Aug. 10, 2004

(54) DEVICE FOR THE ADVANCE INDICATION OF AN AUTOMATICALLY EXECUTED SHIFT

(75) Inventor: Harald Neubecker, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 10/088,883

(22) PCT Filed: Sep. 16, 2000

(86) PCT No.: PCT/EP00/09066

§ 371 (c)(1),
(2), (4) Date: Mar. 21, 2002

(87) PCT Pub. No.: WO01/23787

PCT Pub. Date: Apr. 5, 2001

(30) Foreign Application Priority Data

Sep. 29, 1999 (DE) .................................. 199 46 560

(51) Int. Cl.⁷ ............................................ B60Q 1/00
(52) U.S. Cl. .................. 340/456; 340/438; 200/61.88; 200/61.85; 74/733.1
(58) Field of Search ................................ 340/456, 438; 200/61.88, 61.85, 61.91; 74/733.1

(56) References Cited

U.S. PATENT DOCUMENTS

| | | | |
|---|---|---|---|
| 2,711,525 A | 6/1955 | Kelley | 340/52 |
| 4,267,545 A | 5/1981 | Drone et al. | 340/52 R |
| 4,355,296 A * | 10/1982 | Drone | 340/456 |
| 4,438,423 A * | 3/1984 | Stier | 340/669 |
| 4,800,360 A * | 1/1989 | Dunkley et al. | 340/456 |
| 5,017,916 A * | 5/1991 | Londt et al. | 340/461 |
| 5,050,456 A | 9/1991 | Fukuda | 74/866 |
| 5,816,100 A * | 10/1998 | Fowler et al. | 74/335 |
| 5,893,894 A | 4/1999 | Moroto et al. | 701/53 |

FOREIGN PATENT DOCUMENTS

| | | | | |
|---|---|---|---|---|
| DE | 38 32 970 A1 | 4/1990 | | B60K/20/02 |
| EP | 0 170 465 B1 | 2/1986 | | B60K/41/28 |
| EP | 0 353 310 A1 | 2/1990 | | B60K/20/00 |

* cited by examiner

*Primary Examiner*—Donnie L. Crosland
(74) *Attorney, Agent, or Firm*—Davis & Bujold PLLC

(57) ABSTRACT

In a system for the control of an automatic or automated vehicle variable transmission (2) with a transmission control (6) and a display device (20, 22, 24) for the driver, the display device (20) is provided in order to indicate to the driver the imminent gear shift. After advanced indication of the gear shift, the driver can make a correction engagement in the transmission control (6) or prevent the gear shift.

8 Claims, 1 Drawing Sheet

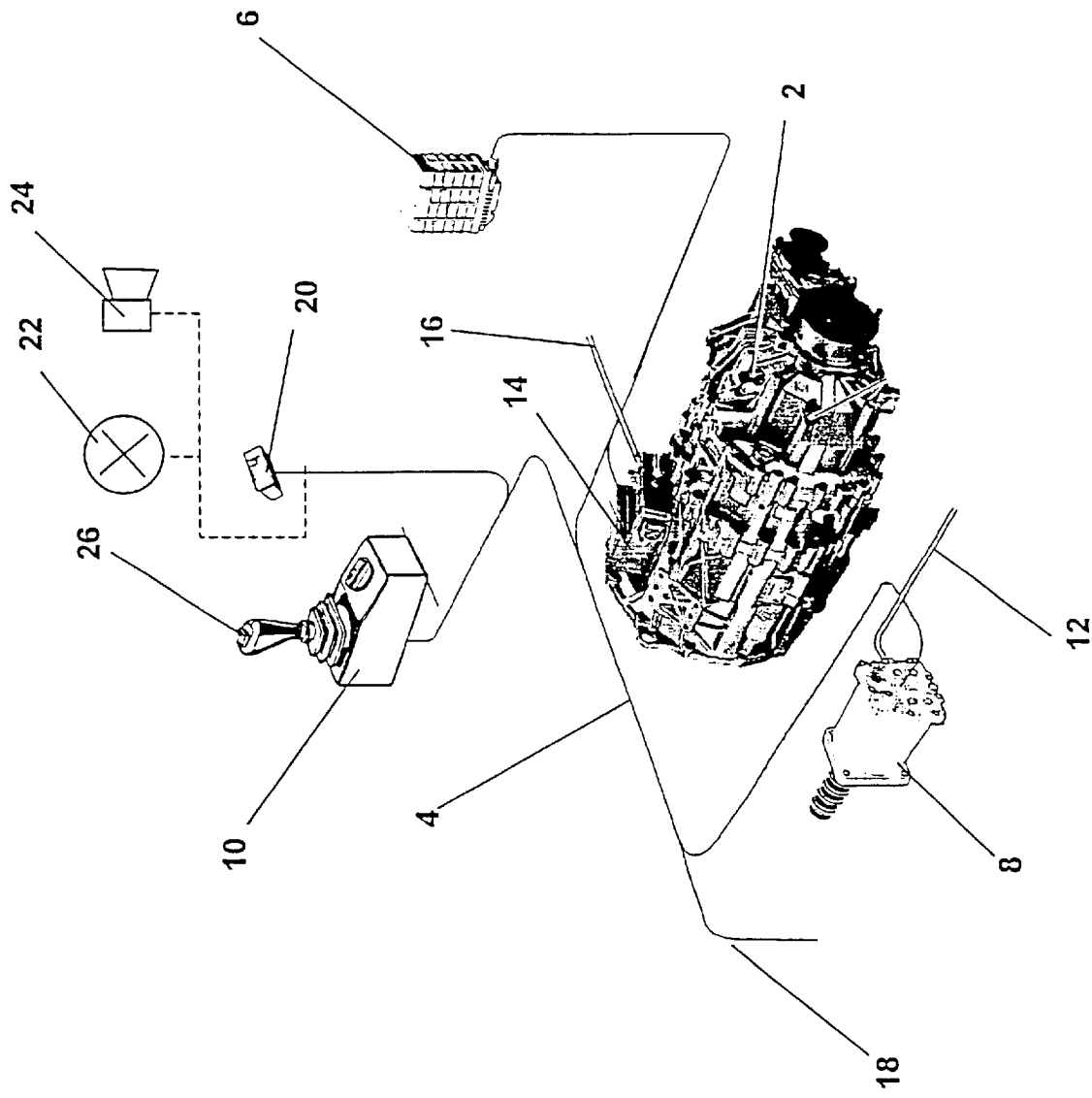

DEVICE FOR THE ADVANCE INDICATION OF AN AUTOMATICALLY EXECUTED SHIFT

FIELD OF THE INVENTION

The invention relates to an automatically executed shift in a vehicle variable transmission.

BACKGROUND OF THE INVENTION

Automatic or automated transmission of vehicles usually engage in accordance with preset shift programs which allow different parameters of the existing state of the vehicle and driver's requests to enter into the calculation of a suitable reduction ratio of the transmission. The sensors that produce the different parameters cannot detect imminent driving situations and influences upon the vehicle originating form the traffic situation and thus also cannot be the basis of a calculation. Situations can thus occur in which the transmission does shift but that are unsuitable and disagreeable for the driver. In those cases the transmission can shift at a moment unforeseeable for the driver or also an unforeseeably higher gear change not suited to the existing traffic situation or topography can be carried out.

EPO 0 170 465 B1 has disclosed by way of example for automated transmissions that calculating shift programs of the transmission indicate to the driver the gear engaged and possible ratio steps which the driver could engage in the vehicle parameters existing at the time both for upshifts and downshifts. Which gear to choose remains left to the driver. In this case the same as formerly, the driver himself has to execute the shifting operation.

The problem on which the invention is based is, in an automatic or automated transmission, to assist a change of the reduction ratio in the transmission which is related to the driving situation.

The proplem is solved by the characteristic features of claim 1. Developments are object of sub-claims.

SUMMARY OF THE INVENTION

In a device for shifting an automatic or automated variable transmission of a vehicle with a transmission control and a display device for the driver, the display device is provided in order to give the driver advanced notice of the imminent gear shift. Thereby the driver can correctly control the vehicle according to the traffic situation or also to topography. In a preferred embodiment the display device is designed acoustically, optically or mechanically. One embodiment shows designing the display device so that it indicates the number of gear steps when changing the reduction ratio. In another development is provided a device with which the driver, after advanced notice of the gear shift, can execute in the transmission control a correction engagement. In another advantageous development a device is provided with which the driver, after advanced notice of the gear shift, can prevent the gear shift.

By the driver being prepared for the gear shift as this is to be attained by the display device, the driver acquires a subjectively better feeling relative to the gear shift course. He can adjust to the eventually generating interruption of the traction. An imminent traffice situation such as a traffic light signal installation blocking the thoroughfare, the end of a bottleneck, a level crossing or pedestrian crossing is detected by the driver with his sense organs. The same applies to the detection of an imminent gradient after a long drive on flat road or reaching of the bottom of the valley after long uphill drive possibly using additional braking devices of the vehicle. The imminent situation can likewise require a shift over several gear steps or conversely not allow it or make it seem unsuitable. The driver can decide whether an advanced notice of a shift still is or is not adequate. He will allow it, correct it, or prevent it accordingly.

BRIEF DESCRIPTION OF THE DRAWINGS

The invention will now be described, by way of example, with reference to the accompanying drawings in which:

FIG. 1 shows an automatically executed shift in a vehicle.

DETAILED DESCRIPTION OF THE INVENTION

The single FIGURE shows an automated transmission 2 which is connected via a control line 4 such as a CAN bus line with a transmission control 6, a clutch regulator 8 and a gear shift lever 10. Via the line 12 compressed air is supplied to a tranmission regulator 14 and via the line 16 compressed air is supplied to the clutch regulator 8. The control line 4 is connected on an interface 18 with other elements of the vehicle not shown are like motor electronics (EDC), motor brake, ABS, ASR or retarders. A display 20 as display device is likewise attached to the control line 4. Alternatively or additionally optical 22 or acoustical 24 display devices can be provided. On the gear shift lever 10 is provided a button 26 with which the driver can correct or prevent the advanced indicated gear shift.

What is claimed is:

1. A method for shifting an automatic transmission (2) of a vehicle comprising the steps of:

controlling the shifting of the automatic transmission according to a shift program of a transmission control;

visually displaying an imminent automatic gear shift for a driver prior to an actual automatic gearshift by the automatic transmission;

one of permitting the actual automatic gear shift and overriding the imminent automatic gear shift by the driver actuating an input device (26) to signal said transmission control (6) to correct the actual gear shift after the visual display of the imminent automatic gear shift.

2. The method for shifting an automatic transmission (2) of a vehicle according to claim 1 further comprising the step of preventing a gear shift by the driver actuating the input device (26) to signal said transmission control (6) to abandon the actual gear shift after the visual display of the imminent automatic gear shift.

3. The method for shifting an automatic transmission (2) of a vehicle according to claim 1 further comprising the step of visually displaying an indication of a number of gear steps during a change of reduction ratio.

4. A method for shifting an automatic transmission (2) of a vehicle comprising the steps of:

controlling the shifting of the automatic transmission according to a shift program of a transmission control;

indicating an imminent automatic gear shift for a driver prior to an actual gearshift by the automatic transmission;

one of permitting the actual gear shift and overriding the imminent automatic gear shift by the driver actuating an input device (26) to signal said transmission control (6) to correct the actual gear shift after the indication of the imminent automatic gear shift.

5. The method for shifting an automatic transmission (2) of a vehicle according to claim 4, comprising the steps of indicating the imminent automatic gear shift for the driver by at least one of an acoustical, optical and mechanical signal.

6. The method for shifting an automatic transmission (2) of a vehicle according to claim 4, further comprising the step of preventing a gear shift by the driver actuating the input device (26) to signal said transmission control (6) to abandon the actual gear shift after the indication of the imminent automatic gear shift.

7. The method for shifting an automatic transmission (2) of a vehicle according to claim 4 further comprising the step of indicating for the driver a number of gear steps during a change of reduction ratio.

8. A system for shifting an automatic transmission (2) of a vehicle comprising:
   a transmission control having a shift program for controlling the shifting of the automatic transmission;
   one of an audible, visual and mechanical indicator for indicating to a driver an imminent automatic gear shift prior to an actual gearshift by the automatic transmission;
   an input device permitting the driver to signal said transmission control (6) to correct the imminent gear shift after the indication of the imminent automatic gear shift to the driver and before the actual gear shift is undertaken by the automatic transmission.

* * * * *